June 14, 1932. G. H. CURTIS 1,863,474
SNOWPLOW
Filed Jan. 24, 1931 3 Sheets-Sheet 1

June 14, 1932.  G. H. CURTIS  1,863,474
SNOWPLOW
Filed Jan. 24, 1931  3 Sheets-Sheet 3

INVENTOR
G. H. Curtis,
BY
ATTORNEY

Patented June 14, 1932

1,863,474

UNITED STATES PATENT OFFICE

GUY HOWARD CURTIS, OF STROME, ALBERTA, CANADA

SNOWPLOW

Application filed January 24, 1931. Serial No. 511,092.

My invention relates to snow plows and an object of the same is to provide a machine of this character embodying a revoluble drum adapted to traverse the ground and a plurality of radially movable blades which are successively projected from the drum as they approach the ground and serve to sever and carry the snow from the ground.

A further object of the invention is to provide a machine of this character having a horizontally disposed endless carrier arranged rearwardly of the drum to convey the snow to a point to one side of the machine.

With the preceding and other objects and advantages in mind, the invention consists in the novel combination of elements, constructions and arrangements of parts and operations to be hereinafter more fully described, claimed and illustrated in the accompanying drawings, wherein:

Figure 1:
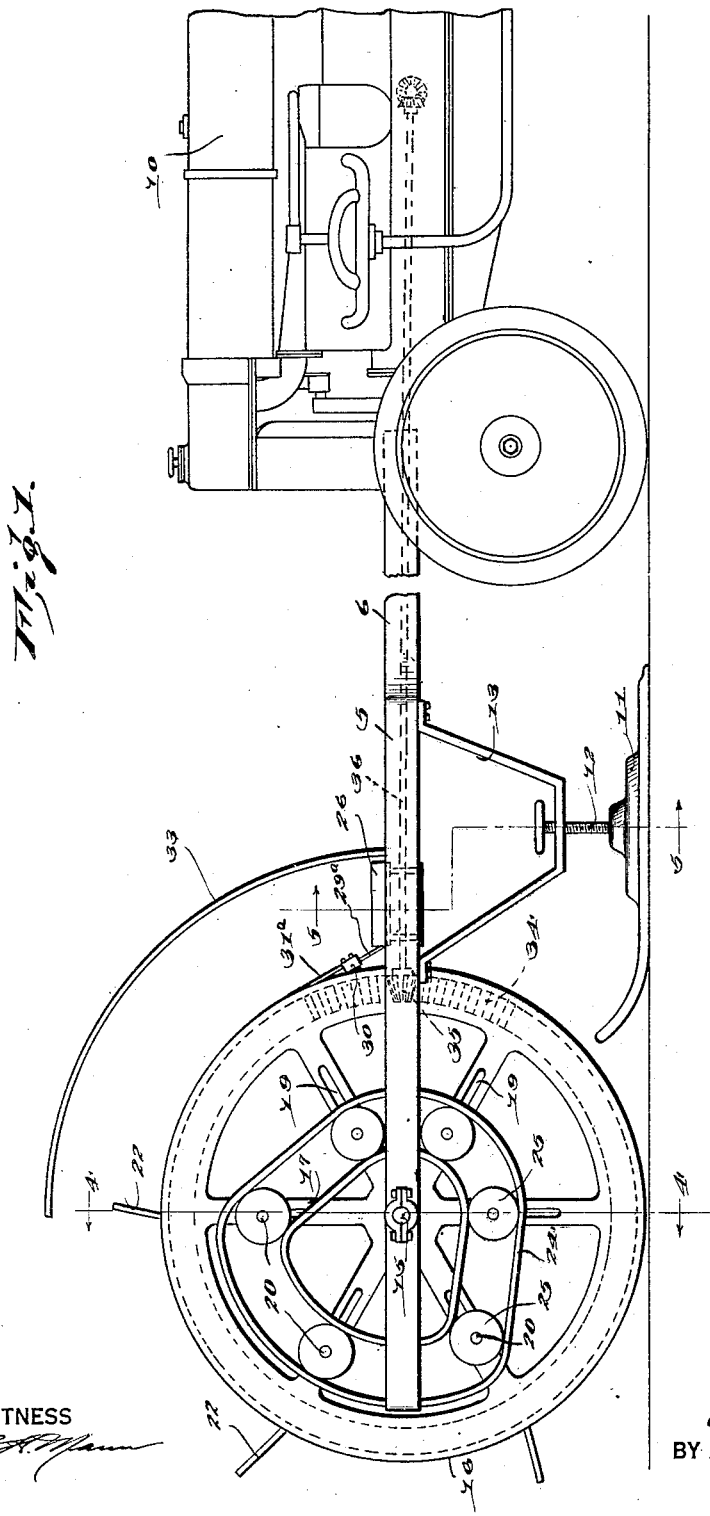
Figure 1 is a side elevation of the invention.
Figure 2:
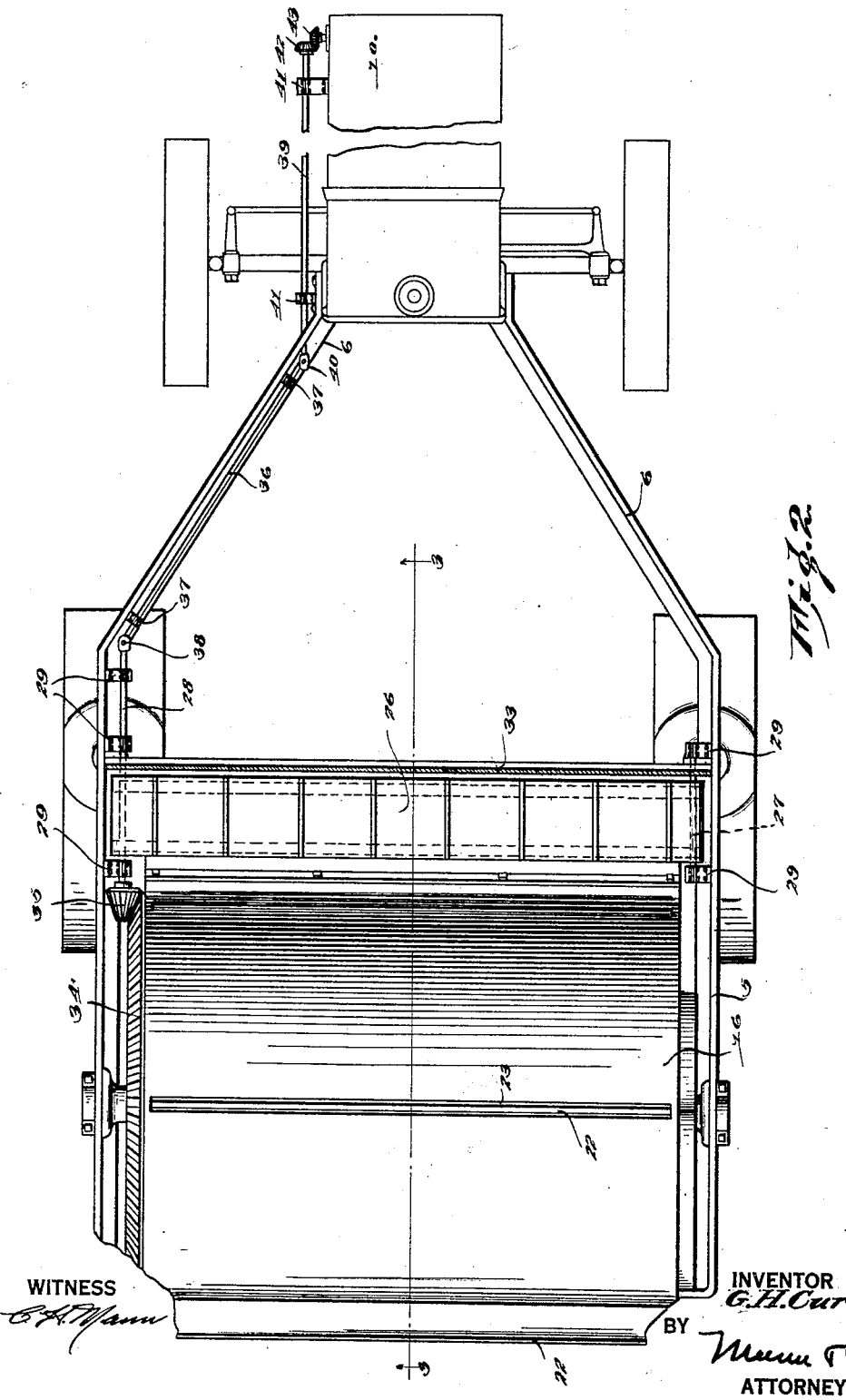
Fig. 2 is substantially a top plan view with parts broken away.

Referring to the invention in detail a horizontally disposed frame 5 having divergent arms 6 at one end for attachment to a conventional tractor 10 is provided. The frame is supported at opposite sides of skis or runners 11 and in order to adjust the frame relative to the ground a vertically disposed screw 12 is swivelled to each of the skis or runners and which are threadedly engaged with brackets 14 depending from the side bars of the frame.

Figure 3:
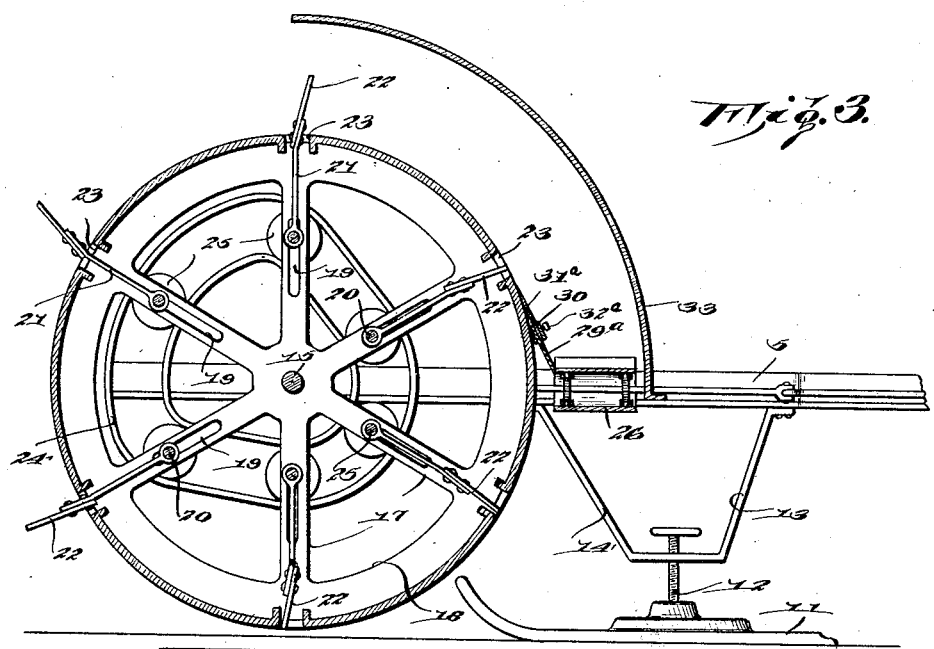
Fig. 3 is a vertical longitudinal sectional view taken on line 3—3 of Fig. 2.

Revoluble about a horizontal shaft 15 supported adjacent the forward end of the frame is a drum 16. As disclosed in Figs. 1 and 3 the frame is elevated to such a height as to slightly support the drum off the ground.

Figure 4:
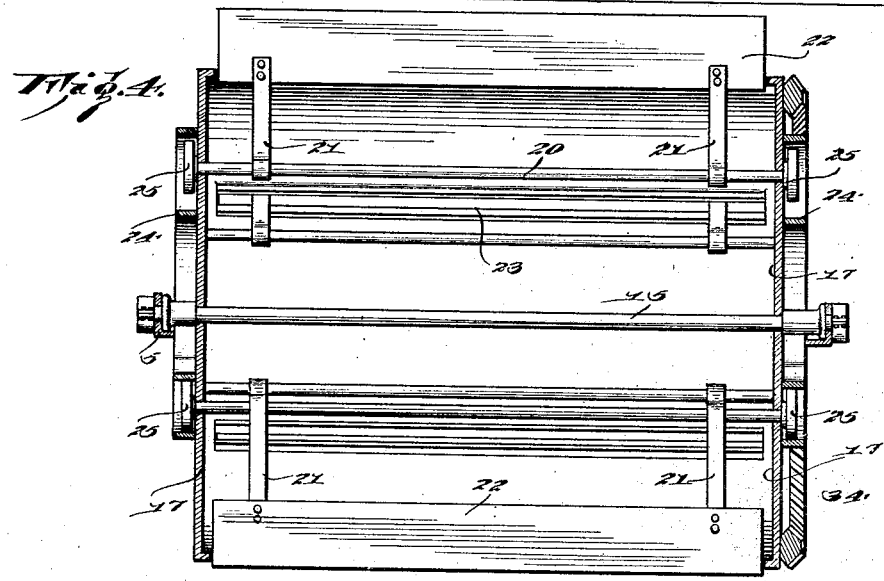
Fig. 4 is a vertical section on line 4—4 of Fig. 1.
Figure 5:
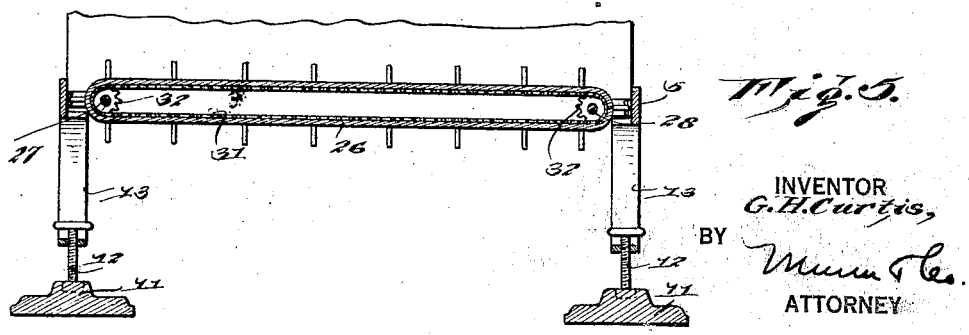
Fig. 5 is a similar view taken on line 5—5 of Fig. 1.

Each end of the drum is formed with a plurality of radially disposed arms 17 which radiate from the axis of the drum to annular side flanges 18 formed with the opposite ends of the drum. Arranged for radial movement in longitudinal slots 19 formed in the arms are rods 20 which extend longitudinally through the drum. Rigid with each of the rods 20 is a pair of parallel bars 21 which extend toward the periphery of the drum and carry a relatively flat blade 22. As disclosed in Fig. 4 the blades 22 are substantially the same length as the drum and as disclosed in Fig. 3 they lie at an angle with respect to the bars 21.

For each of the blades 22 a longitudinal slot 23 is provided in the drum through which the blades are adapted to be projected and retracted.

In order to project and retract the blades at predetermined times an eccentric track way 24 is attached to the frame adjacent each end of the drum. Rollers 25 are carried by the ends of the rods 20 and are arranged in the eccentric track ways. The track ways are arranged so that the blades will be successively projected from the drum as they approach the ground. Thus each blade penetrates the snow and carries a quantity of the same around the axis 15 of the drum. As the blades reach a point beyond dead center, rearwardly of the axis they are retracted into the drum which causes the snow to be dislodged therefrom and gravitate downwardly, over the drum.

For the purpose of carrying the snow transversely of the frame an endless belt 26 is arranged horizontally of the frame rearwardly of the drum and in horizontal alinement with the axis thereof. The conveyor belt 26 is trained about horizontally disposed shafts 27 and 28 mounted in bearings 29 attached to opposite sides of the frame. Sprocket chains 31 are carried by the endless belt and are engaged with sprocket wheels 32 fixed to the shafts 27 and 28. An angularly disposed plate 29a extends from the forward edge of the conveyor to a point in close proximity to the drum and carries a yoke 30. A scraper blade 31a is removably held in the yoke by set screws 32a and has its upper edge contacting with the drum to scrape the snow therefrom and direct the same downwardly onto the conveyor belt.

An upwardly curved plate 33 extends from the frame slightly in advance of the endless belt 26. This plate extends the entire width of the frame and extends forwardly to a point above the axis 15 and cooperates with the drum and blade 22 in directing the snow onto the conveyor belt. In order to rotate the drum one end of the same is provided with a ring gear 34 which is engaged by a bevelled gear 35 carried by the forward end of the shaft 28. Power is imparted to the shaft 28 by means of a horizontally disposed shaft 36 supported in bearings 37 attached to one of the arms 6. One end of the shaft 36 is universally connected with the shaft 28 as indicated at 38 while its opposite end is connected with a driven shaft 39 by universal connection 40.

This shaft 39 extends longitudinally on one side of the tractor 10 and is supported in bearings 41 attached to one side of the tractor. A gear 42 is carried by one end of the shaft 39 which is engaged by a drive gear 43, the latter being driven from the tractor motor, not shown.

In the operation of the invention the tractor pushes the frame along the roadway and the drum driven in a clockwise direction. Incident to the rotation of the drum the rollers 25 are caused to traverse the cam-shaped trackway and successively project the blades from the drum as they approach the ground and reversely, causes them to be retracted as they move beneath the plate 33. It will be observed that the blades dig or cut into the snow and by reason of them assuming a position at an angle with respect to the radius of the periphery of the drum when fully projected they lift and carry the snow around the axis of the drum where it is deposited onto the endless belt as above stated.

What is claimed is:

1. In a snow plow a frame, a drum rotatably mounted in the frame, a plurality of projectable and retractible blades supported on the drum, rollers fixed to the blades at opposite ends thereof and a cam-shaped trackway supported at each side of the drum in which the rollers move and cooperating with the latter in causing the blades to be successively projected and retracted at predetermined intervals, and an upwardly curved plate arising from the frame and overlying the drum and cooperating with the latter in directing the snow in a rearward direction, and a horizontally disposed conveyor supported on the frame between the drum and plate.

2. In a snow plow a frame, a drum rotatably mounted in the frame, a plurality of projectable and retractible blades supported on the drum, rollers fixed to the blades at opposite ends thereof and a cam-shaped trackway supported at each side of the drum in which the rollers move and cooperating with the latter in causing the blades to be successively projected and retracted at predetermined intervals, and an upwardly curved plate arising from the frame and overlying the drum and cooperating with the latter in directing the snow in a rearward direction, and a horizontally disposed conveyor supported on the frame between the drum and plate, and a scraper blade supported adjacent the conveyor and resting on the drum.

3. In a snow plow a frame, a revoluble drum supported thereby, parallel guides arranged within the drum at the opposite ends thereof, a rod slidable in each pair of parallel guides, a blade fixed to each rod, the drum having slots through which the blades slide, rollers on the ends of the rods, and eccentrically-shaped track ways supported at each side of the drum in which the rollers are mounted, and cooperating with the latter in successively projecting and retractng the blades at predetermined intervals.

GUY HOWARD CURTIS.